US010408261B2

(12) United States Patent
Hayashi et al.

(10) Patent No.: US 10,408,261 B2
(45) Date of Patent: Sep. 10, 2019

(54) LINEAR MOTION GUIDE UNIT

(71) Applicant: NIPPON THOMPSON CO., LTD., Tokyo (JP)

(72) Inventors: Tomoyuki Hayashi, Kamakura (JP); Shoji Nagao, Kamakura (JP); Masahiro Miura, Tokyo (JP)

(73) Assignee: NIPPON THOMPSON CO., LTD., Tokyo (JP)

( * ) Notice: Subject to any disclaimer, the term of this patent is extended or adjusted under 35 U.S.C. 154(b) by 0 days.

(21) Appl. No.: 15/939,729

(22) Filed: Mar. 29, 2018

(65) Prior Publication Data

US 2018/0283450 A1 Oct. 4, 2018

(51) Int. Cl.
*F16C 29/06* (2006.01)
*F16C 29/04* (2006.01)
*F16C 29/12* (2006.01)

(52) U.S. Cl.
CPC .......... *F16C 29/063* (2013.01); *F16C 29/046* (2013.01); *F16C 29/065* (2013.01); *F16C 29/0607* (2013.01); *F16C 29/0609* (2013.01); *F16C 29/0611* (2013.01); *F16C 29/123* (2013.01)

(58) Field of Classification Search
CPC .............. F16C 29/0607; F16C 29/0611; F16C 29/065; F16C 29/0666; F16C 29/0673; F16C 29/123
See application file for complete search history.

(56) References Cited

U.S. PATENT DOCUMENTS

| 7,204,036 | B2 * | 4/2007 | Kato | F16C 29/0607 33/706 |
| 7,832,930 | B2 * | 11/2010 | Geka | F16C 29/0607 384/15 |
| 8,123,408 | B2 * | 2/2012 | Nishiwaki | F16C 29/0607 384/44 |
| 2005/0018933 | A1 * | 1/2005 | Ishihara | F16C 29/0607 384/44 |
| 2006/0120637 | A1 * | 6/2006 | Kuwabara | F16C 29/0607 384/44 |

(Continued)

FOREIGN PATENT DOCUMENTS

| JP | H07-91446 A | 4/1995 |
| JP | 2014234858 A | 12/2014 |

*Primary Examiner* — Phillip A Johnson
(74) *Attorney, Agent, or Firm* — Browdy and Neimark, PLLC (57) ABSTRACT

A linear motion guide unit restrains fluctuations in sliding friction and generation of heat by correcting the postures of rollers having been inclined in a no-load area such that their axes become orthogonal to a guide surface of a carriage to thereby introduce the rollers in proper postures into a load area. A retainer plate of the guide unit has a guide surface for guiding end surfaces of the rollers and has protrusions protruding from the guide surface at its opposite end portions facing crownings of the carriage. The rollers rolling from a turnaround passage to a load-carrying race are pressed by the protrusions toward the guide surface of the carriage so as to be arrayed in such a posture that the axes of the rollers become orthogonal to the guide surface on the inlet side of the crowning of the carriage, whereby the occurrence of roller skew is prevented.

12 Claims, 8 Drawing Sheets

(56) References Cited

U.S. PATENT DOCUMENTS

2014/0376838 A1* 12/2014 Hsu .................... F16C 43/04
384/44
2015/0093053 A1* 4/2015 Liao ................ F16C 29/0609
384/13

* cited by examiner

LINEAR MOTION GUIDE UNIT

FIELD OF THE INVENTION

The present invention relates to a linear motion guide unit of a roller type in which a retainer plate has means for pressing end surfaces of rollers for arraying the rollers rolling into a load-carrying race such that the axes of the rollers become orthogonal to a guide surface of a carriage.

BACKGROUND OF THE INVENTION

According to a conventionally known linear motion guide unit, a retainer plate has a light structure and can be simply and easily held to end caps to thereby reduce the size of a slider. The linear motion guide unit is composed of a guide rail, and the slider moving on the guide rail via rollers. The slider has a carriage and end caps fixed to the respective opposite ends of the carriage. The rollers located on the raceway surface side of the carriage are retained to the carriage by the retainer plate. The retainer plate is fixed to the carriage by screwing fastening bolts inserted through respective insertion holes formed in the carriage into respective nuts disposed at the back of the retainer plate. The retainer plate is composed of a pair of flat plate portions formed by bending a thin plate along its longitudinal direction in such a manner as to have a V-shaped section. The pair of flat plate portions are formed to be greater in length than the carriage, and opposite end portions thereof are fixedly fitted into respective engagement grooves formed in the end caps. The flat plate portions guide the end surfaces of the rollers rolling on the upper and lower raceway surfaces of the carriage to thereby retain the rollers on the raceway surfaces. In order to hold the retainer plate to the slider, the carriage has the insertion holes formed therein, and the bolts are screwed into the respective nuts provided on the back of the retainer plate (see, for example, Japanese Patent Application Laid-Open No. 2014-234858).

According to another conventionally known linear motion guide unit, retainer means for retaining cylindrical rollers is snap-on fixed to a slider to thereby increase the rated load of the slider. In the linear motion guide unit, a retainer plate is disposed between the cylindrical rollers disposed on an upper raceway surface of the carriage and the cylindrical rollers disposed on a lower raceway surface of the carriage. A holder portion of a fixing band is engaged with an engagement groove of the retainer plate and with engagement grooves of end caps. Engagement beaks at the ends of bend portions of the fixing band are engaged with respective engagement holes formed in the end caps. The retainer means for retaining the cylindrical rollers is incorporated in the slider and retains the cylindrical rollers to a load-carrying race formed by a guide rail and a carriage (see, for example, Japanese Patent Application Laid-Open No. H07-91446).

Meanwhile, conventionally, in a linear motion guide unit which uses rollers as rolling elements, in some cases, the axes of rollers rolling in the load-carrying race are inclined with respect to the moving direction. The inclined rolling rollers may cause the occurrence of skew in which the rollers roll while generating sliding friction. In conventional linear motion guide units, a beak of the retainer plate retains the rollers, or rolling elements, to the raceway surface of the carriage while a guide surface of the retainer plate guides the end surfaces of the rollers, thereby preventing the occurrence of skew. However, in order to smoothly circulate the rollers, a small gap must exist between the end surfaces of the rollers and the guide surface. According to conventional measures to prevent the occurrence of skew, components which constitute a circulating circuit are manufactured with high precision for reducing the gap between the rollers and the guide surface. However, such measures are costly. Therefore, inexpensive measures to prevent the occurrence of skew have been desired.

SUMMARY OF THE INVENTION

The present invention has been conceived to solve the above problem, and an object of the present invention is to provide an improved linear motion guide unit in which the postures of rollers having been inclined in a no-load area of a circulating circuit are corrected such that the axes of the rollers become orthogonal to a guide surface of a carriage so that the rollers roll into a load area in proper postures to thereby restrain fluctuations in sliding friction and the generation of heat. In the improved linear motion guide unit, a retainer member of a retainer plate has a slit at each of opposite end portions thereof so as to form a pair of elastically deformable cantilevered retainer portions each having a protrusion, and the protrusion has inclined surfaces at its opposite ends for gradually correcting the postures of rollers such that the axes of the rollers become orthogonal to the guide surface of the carriage.

Means to Solve the Problems

The present invention provides a linear motion guide unit comprising a guide rail and a slider. The guide rail has first raceway surfaces extending in a longitudinal direction on respective opposite longitudinal sides of the guide rail. The slider straddles the guide rail, has second raceway surfaces facing the respective first raceway surfaces, and slides in relation to the guide rail via rolling elements, or rollers, rolling in load-carrying races composed respectively of the first raceway surfaces and the second raceway surfaces. The slider has a carriage, end caps, the rollers, and retainer plates. The carriage has the second raceway surfaces and return passages extending in parallel with the second raceway surfaces. The end caps are fixedly attached to respective longitudinally opposite end surfaces of the carriage. The rollers roll in circulating circuits composed respectively of the load-carrying races, the return passages, and turnaround passages formed in the end caps for establishing communication between the load-carrying races and the return passages. The retainer plates are disposed along the respective load-carrying races and adapted to retain the rollers to the slider. The carriage has first guide surfaces and gently curved crownings. The first guide surfaces guide one end surfaces of the rollers and extend along the respective load-carrying races extending in the longitudinal direction. The crownings are formed at opposite end portions of the second raceway surfaces for allowing the rollers to smoothly enter load areas of the load-carrying races from no-load areas of the load-carrying races.

The retainer plates have second guide surfaces and protrusions. The second guide surfaces guide the other end surfaces of the rollers. The protrusions protrude from the second guide surfaces at opposite end portions of the retainer plates facing the respective crownings.

The rollers rolling from the turnaround passages to the load-carrying races are pressed toward the first guide surfaces by the protrusions so as to be arrayed in such a posture that axes of the rollers become orthogonal to the first guide surfaces on an inlet side of the crownings, thereby preventing the occurrence of skew of the rollers.

Each of the retainer plates has a convex portion having a V-shaped section and formed along the longitudinal direction between the upper and lower second guide surfaces. The convex portion of the retainer plate is fitted into a dent-shaped locking groove having a V-shaped section and formed in the carriage along the longitudinal direction between the upper and lower second raceway surfaces. Fastening bolts inserted through respective through holes of wing portions of the carriage are screwed into respective threaded holes formed in the retainer plates to thereby fix the retainer plates to the carriage.

Each of the retainer plates comprises a retainer member, a fixing member, and frame members. The retainer member is made of a synthetic resin and has the second guide surfaces adapted to guide the other end surfaces of the rollers. The fixing member is made of metal, is fitted into a recess formed in the retainer member on a back side of the second guide surfaces, and fixes the retainer member to the carriage. The frame members are disposed in respective notches formed in the retainer member at a plurality of predetermined longitudinal positions and are adapted to form a predetermined gap between the fixing member and the carriage.

The retainer member has a gable-shaped cross section orthogonal to the longitudinal direction. Inclined surfaces of the retainer member serve as the planar second guide surfaces. A top of the retainer member is fitted into the dent-shaped locking groove of the carriage. The fixing member has a plurality of threaded holes formed at predetermined intervals in the longitudinal direction. The retainer plate and the carriage have through holes formed at positions corresponding to the threaded holes. The fastening bolts are inserted through the respective through holes from outside the carriage and are screwed into the respective threaded holes to thereby fix the retainer plate to the carriage.

The retainer member has slits which are formed in opposite end portions thereof at intermediate positions between the upper and lower second guide surfaces and which extend in the longitudinal direction so that a pair of elastically deformable cantilevered retainer portions are formed on opposite sides of each of the slits. When the upper and lower rollers rolling in the load-carrying races pass the cantilevered retainer portions, the cantilevered retainer portions press the end surfaces of the rollers toward the first guide surfaces of the carriage so as to array the rollers in the posture in which the axes of the rollers are orthogonal to the first guide surfaces. Further, the slits extend from the opposite end portions of the retainer plate into a load area of the load-carrying race and are longer than the crownings.

The retainer member has a spring member disposed between the cantilevered retainer portions and pressing the cantilevered retainer portions in slit-opening directions. Also, the length of the protrusions extending along the second guide surfaces are substantially two to three times a roller diameter of the rollers.

The end portions of each protrusion have inclined surfaces extending between a top of the protrusion and the second guide surface such that a longitudinal section of the protrusion has a trapezoidal shape. A surface of the protrusion facing the first guide surface is a plane in parallel with the first guide surface. A first inclined surface which is the inclined surface located on the side toward the turnaround passage is smaller in angle of inclination than a second inclined surface which is the inclined surface located on the side toward the load carrying race. Further, a longitudinal length of the first inclined surface is substantially 1.5 times or more the roller diameter, and a longitudinal length of the second inclined surface is substantially 0.5 times or more the roller diameter.

Each of the protrusions extends from a region of the corresponding crowning formed on the carriage, which region is located at one end of the crowning and defines the no-load area, into a region of the corresponding crowning which defines the load area. Further, the protrusions are formed on the side toward the second raceway surface of the carriage, and a width of the protrusions in a direction orthogonal to the longitudinal direction of the retainer plate is substantially 0.5 times the roller diameter.

Effect of the Invention

In the linear motion guide unit of the present invention, as mentioned above, the protrusion provided at each of opposite end portions of the retainer member made of resin of the retainer plate comes into contact with one end surfaces of the rollers to thereby press the other end surfaces of the rollers against the guide surface of the carriage. By this action, the opposite end surfaces of the rollers are pressed between the protrusion and the guide surface, whereby the inclined rollers are corrected in posture such that the axes of the rollers become orthogonal to the guide surface of the carriage, so that the rollers can be arrayed in a proper posture. That is, according to the present linear motion guide unit, the rollers having been inclined as a result of rolling in the no-load area of the circulating circuit are arrayed in such a posture that the axes of the rollers become orthogonal to the guide surface of the carriage, so that the rollers can be introduced in a proper posture into the load area. Therefore, there can be restrained scratchy sliding, early emergence of wear, fluctuations in sliding friction, and the generation of heat, which could otherwise result from skew. Further, according to the present linear motion guide unit, since by means of the inclined surfaces formed at the opposite end portions of the protrusion of the retainer member, the rollers can be gradually arrayed in such a posture that the axes of the rollers become orthogonal to the guide surface of the carriage, the rollers can smoothly roll in the circulating circuit. According to the present linear motion guide unit, when the rollers pass the protrusion of the retainer member, the protrusion is pressed against the end surfaces of the rollers through utilization of bending of the cantilevered retainer portions of the retainer member, so that the inclined rollers can be reliably corrected in posture and arrayed such that the axes of the rollers become orthogonal to the guide surface of the carriage. Since the present linear motion guide unit is configured as mentioned above, there is no need to raise the individual accuracies of components and to strictly control the gap between the rollers and the circulating circuit, so that costs can be reduced. Further, according to the present linear motion guide unit, the spring member is disposed between the cantilevered retainer portions at each of opposite end portions of the retainer member for urging the cantilevered retainer portions to elastically deform, whereby the protrusion can be reliably pressed against the end surfaces of the rollers. Since screwing the retainer plate to the carriage involves potential deformation of the resin retainer member of the retainer plate as a result of subjection to a fastening force of the fastening bolts, the frame members made of metal are disposed at screwing positions of the retainer member so as to fix the retainer plate to the carriage via the frame members. As a result, since the fastening force of the fastening bolts is not directly applied to the retainer member, deformation of the retainer member caused by screw engagement can be restrained.

DETAILED DESCRIPTION OF THE EMBODIMENT

The linear motion guide unit according to the present invention is applicable to relative sliding members used in various types of apparatus such as machine tools, semiconductor fabrication systems, and precision measuring apparatus.

An embodiment of the linear motion guide unit according to the present invention will next be described with reference to the drawings.

Figure 1:
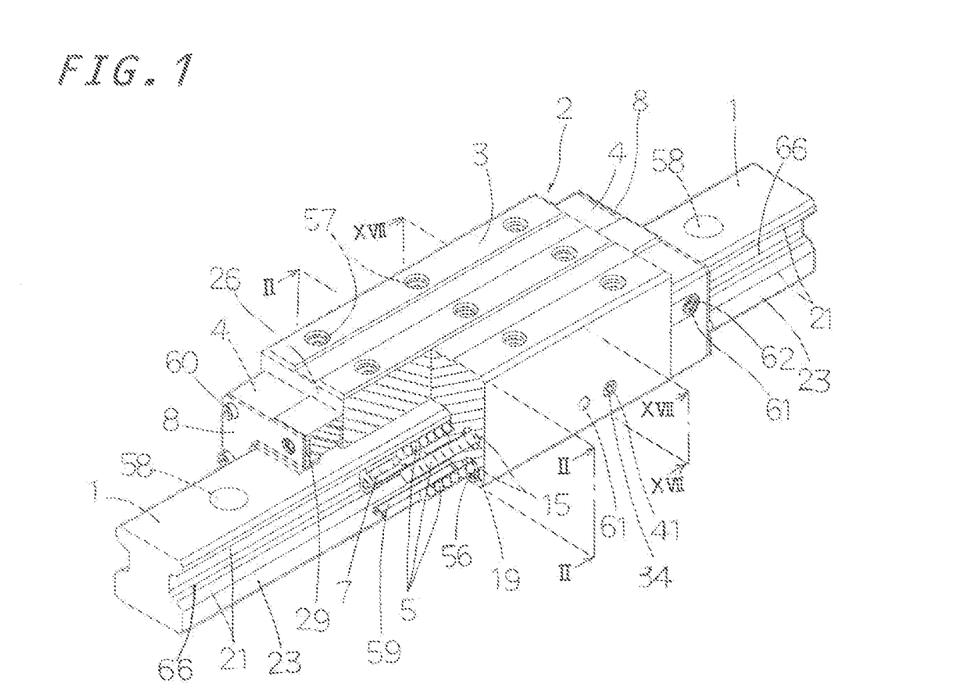
FIG. 1 is a partially cutaway sectional perspective view showing an embodiment of a linear motion guide unit according to the present invention.

As shown in FIG. 1, the linear motion guide unit according to the present invention generally includes a guide rail 1 having raceway surfaces 21 (first raceway surfaces) extending in the longitudinal direction on respective longitudinal sides 23 of the guide rail 1, and a slider 2 which has raceway surfaces 22 (second raceway surfaces) facing the respective raceway surfaces 21 as a result of its wing portions straddling the guide rail 1 and which slides in relation to the guide rail 1 via a plurality of rolling elements, or rollers 5, rolling in load-carrying races 14 each composed of the raceway surface 21 and the raceway surface 22. The slider 2 includes a carriage 3 having a cross section resembling the reversed letter U and having the raceway surfaces 22 and return passages 15 extending in parallel with the raceway surfaces 22, end caps 4 fixedly attached to respective longitudinally opposite end surfaces 26 of the carriage 3, end seals 8 disposed on respective end surfaces of the end caps 4, the rollers 5 rolling in endless circulating circuits 17 each composed of the load-carrying race 14, the return passage 15, and turnaround passages 16 formed in the end caps 4 for establishing communication between the load-carrying race 14 and the return passage 15, and retainer plates 7 disposed along the respective load-carrying races 14 for retaining the rollers 5 to the slider 2. The guide rail 1 has holes 58 for allowing bolts (not shown) to be inserted therethrough in mounting the guide rail 1 on a counter member such as a base, a bed, or a machine pedestal. The carriage 3 has threaded holes 57 formed in its upper surface for mounting the carriage 3 to a counter member such as a workpiece or a device. The end cap 4 has oil supply holes 61 formed therein for supplying lubricant into the turnaround passages 16. A stopcock 62 is attached to each oil supply hole 61 for preventing leakage of lubricant from inside the end cap 4. The end caps 4, lubricant supply plates 29, and the end seals 8 are fixed to the carriage 3 with fastening bolts 60.

Figure 2:
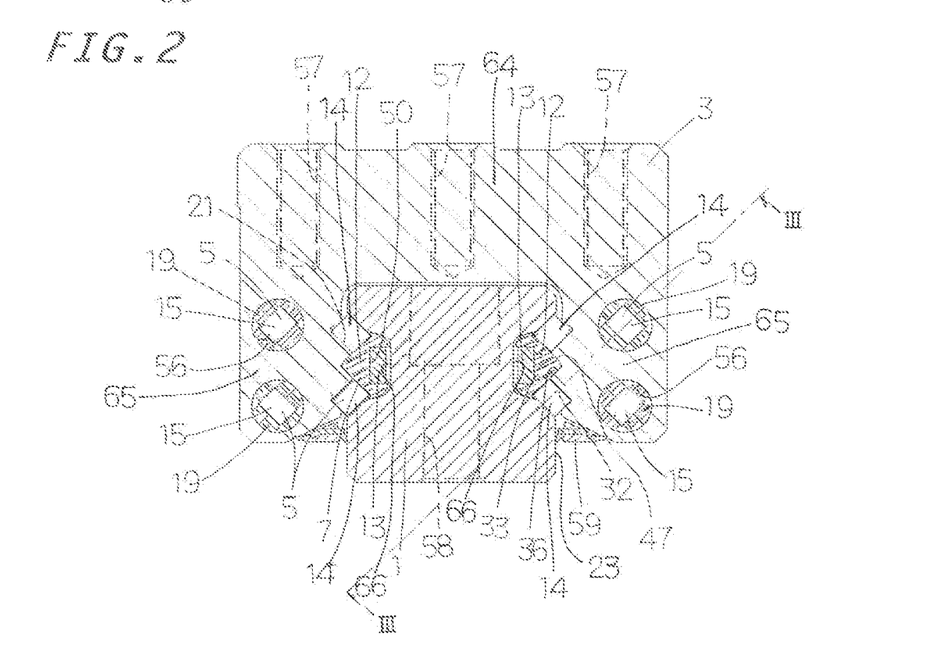
FIG. 2 is a sectional view of the linear motion guide unit taken along line II-II of FIG. 1.
Figure 3:
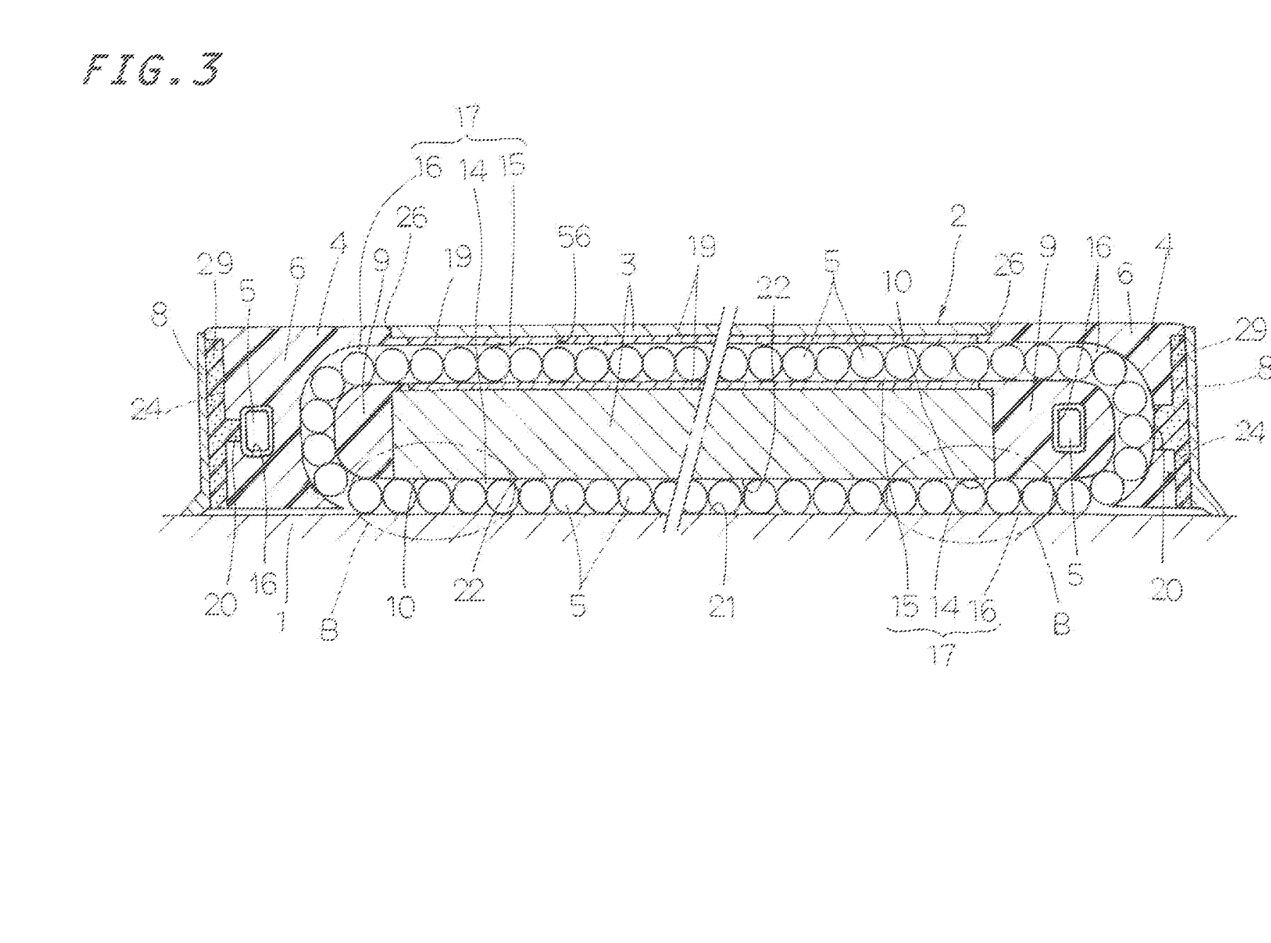
FIG. 3 is a sectional view taken along line III-III of FIG. 2, showing a circulating circuit in which rolling elements, or rollers, roll.

As shown in FIG. 2, the present linear motion guide unit is of a four-race type having four load-carrying races 14. The carriage 3 includes a central portion 64 having threaded holes 57, and a pair of wing portions 65 extending downward from the opposite ends of the central portion 64. The opposite wing portions 65 of the carriage 3 have the return passages 15 formed therein in which the rollers 5 roll under no load. Each return passage 15 is formed in a sleeve 19 inserted into an insertion hole 56 formed in the wing portion 65 of the carriage 3. The longitudinal sides 23 of the guide rail 1 have respective clearance grooves 66 formed therein along the longitudinal direction. Each wing portion 65 of the carriage 3 has a dent-shaped locking groove 36 formed therein between the upper and lower raceway surfaces 22, and a retainer plate 7 is disposed in the dent-shaped locking groove 36 for retaining the rollers 5 to the slider 2. Each wing portion 65 of the carriage 3 has guide surfaces 31 (first guide surfaces) formed thereon for guiding one end surfaces 25 of the rollers 5, and the retainer plate 7 facing the guide surfaces 31 has guide surfaces 32 (second guide surfaces) formed thereon for guiding the other end surfaces 25 of the rollers 5. A lower seal 59 is disposed between the lower surface of each wing portion 65 and the guide rail 1. Each end cap 4 includes an end cap body 6 having the outer circumferential surfaces of the turnaround passages 16 formed therein, and a spacer 9 (FIG. 3) fitted in a recess formed in the carriage-side end surface thereof. As shown in FIG. 3, the end cap body 6 has the lubricant supply plate 29, or a lubricant-impregnated member, fitted in a concave portion 24 formed in the end-seal-8-side end surface thereof. As shown in FIG. 3, protrusions of the lubricant supply plate 29, or a lubrication plate, are exposed to the respective turnaround passages 16 from openings 20 formed in the outer end surface of the end cap body 6. The rollers 5 rolling in the turnaround passages 16 come into contact with the protrusions to thereby be supplied with lubricant. The lubricant supply plate 29 is formed of a sintered porous resin.

Figure 13:
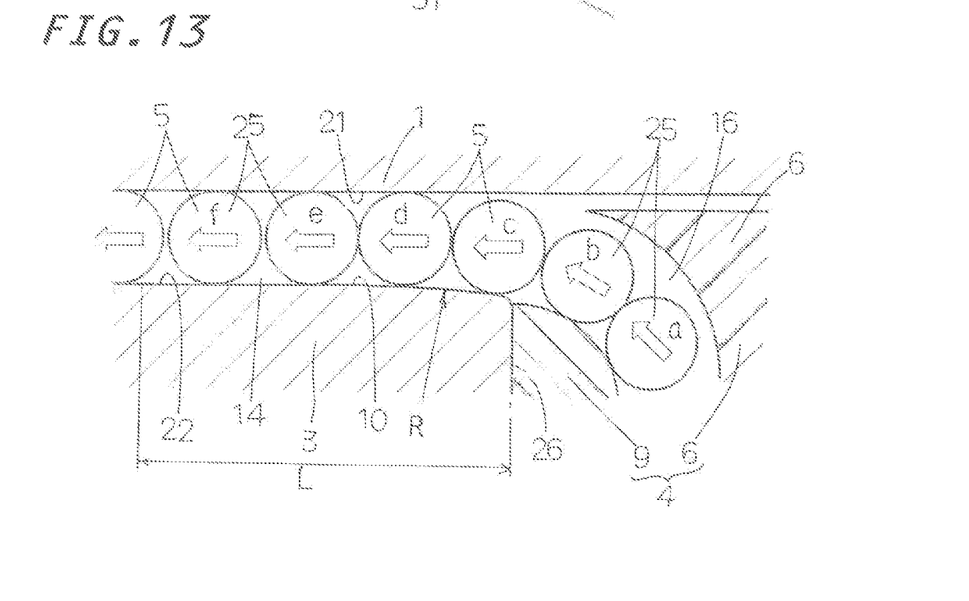
FIG. 13 is a conceptual view showing the movement of rollers rolling from a turnaround passage into the load-carrying race in the linear motion guide unit, the view being a plan view as viewed from the roller end surface side of FIG. 14.
Figure 14:
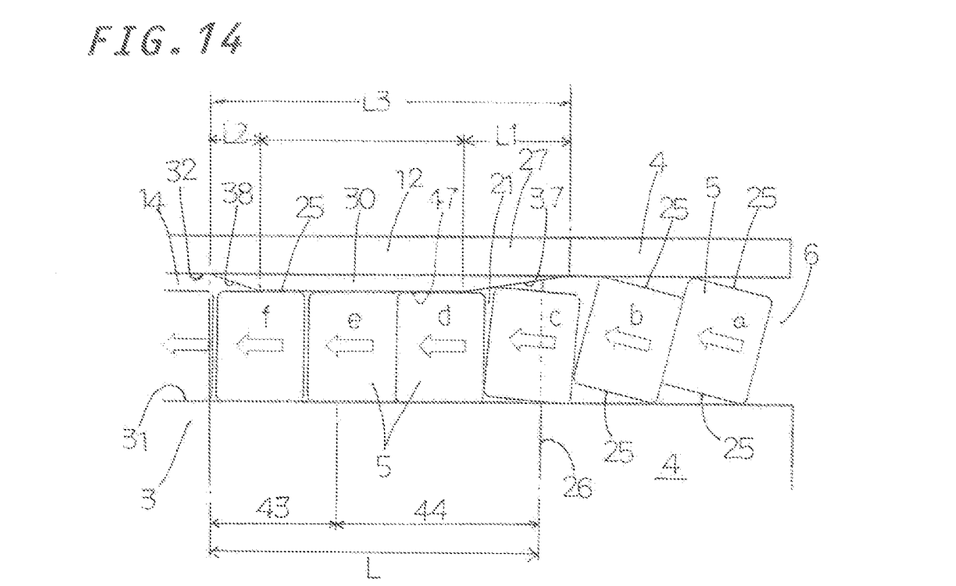
FIG. 14 is an explanatory conceptual view showing the state of the rollers rolling from the turnaround passage into the load-carrying race in the linear motion guide unit.

Such a sintered porous resin is formed by, for example, heating a compacted body of ultra-high-molecular-weight synthetic resin particles such that the compacted body has a porous structure in which communicating spaces are formed among the synthetic resin particles. Each of the raceway surfaces 22 formed on the carriage 3 has crownings 10 formed at respective opposite end portions thereof and having a gently curved shape. As shown in FIGS. 13 and 14, each crowning 10 is composed of a region which defines a no-load area 44 located on the end-surface side, and a region which defines a load area 43 extending to the raceway surface 22. The crowning 10 allows the rollers 5 to smoothly roll into the load-carrying race 14.

Figure 4:
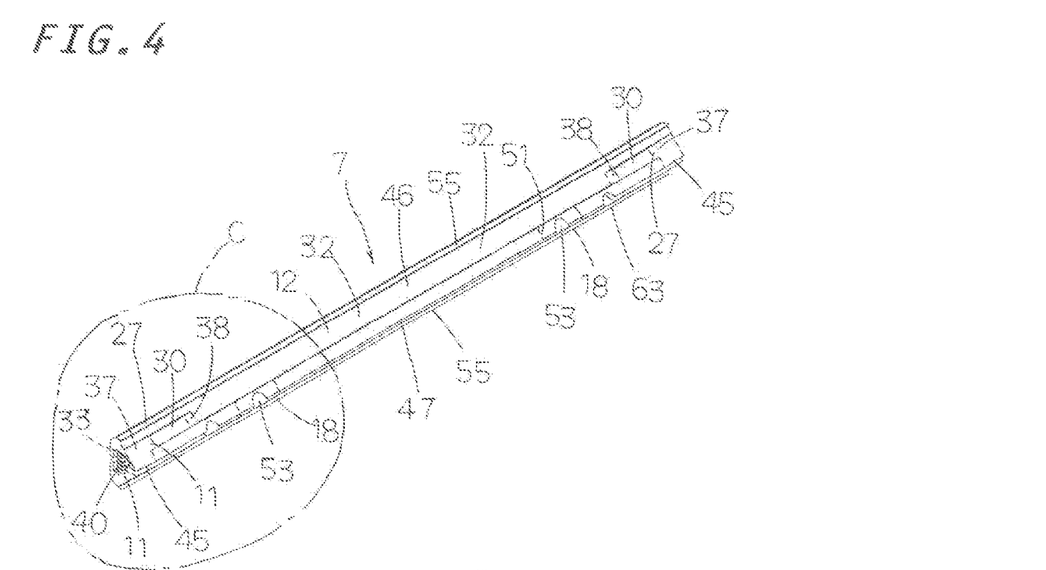
FIG. 4 is a perspective view showing a retainer plate incorporated in the linear motion guide unit of FIG. 1.
Figure 5:
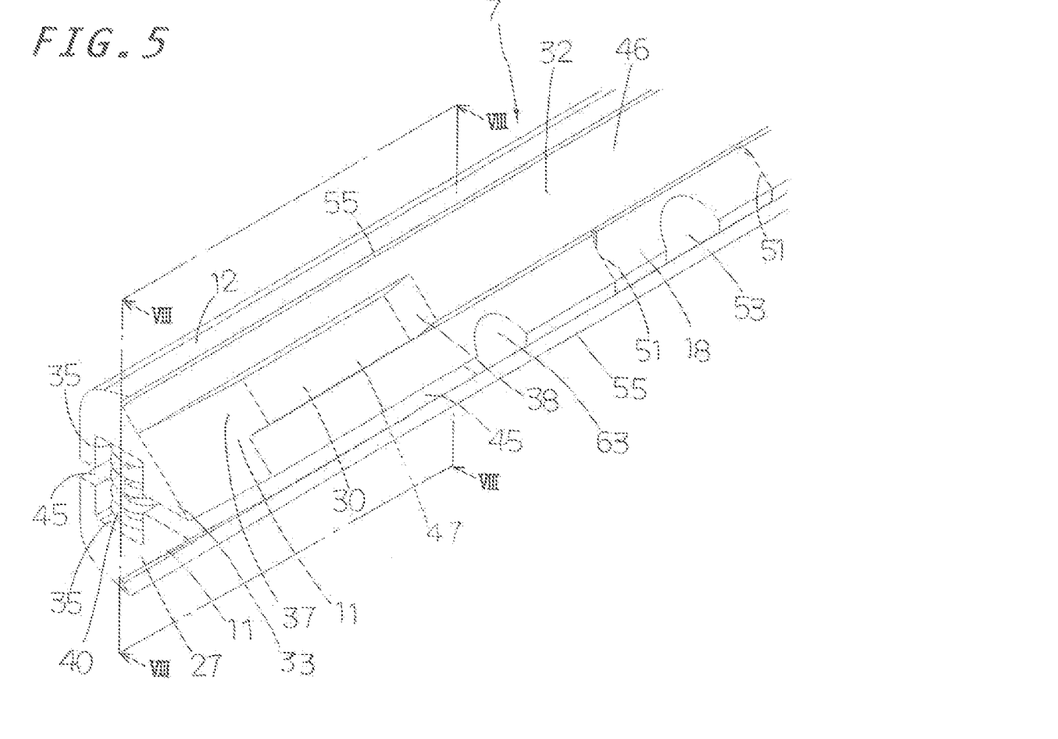
FIG. 5 is an enlarged perspective view showing a region of the retainer plate marked with the letter C in FIG. 4.
Figure 6:
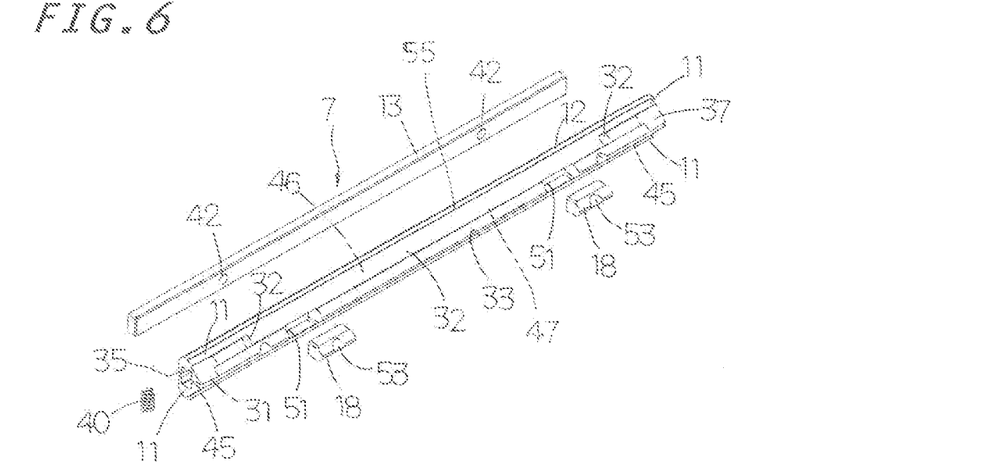
FIG. 6 is an exploded perspective view of the retainer plate of FIG. 4.
Figure 7:
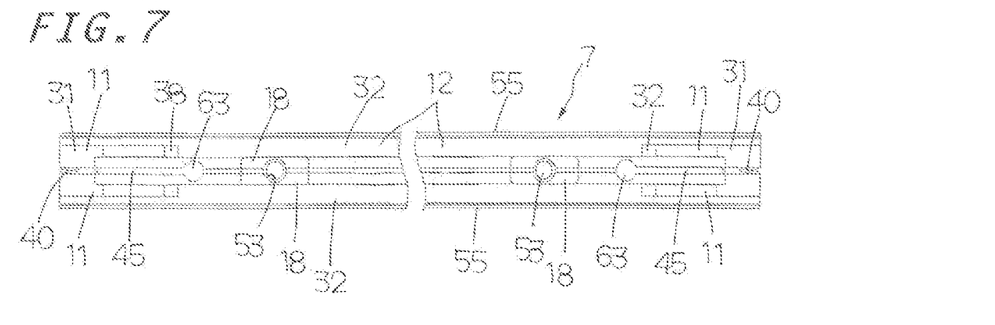
FIG. 7 is a plan view of the retainer plate of FIG. 4.
Figure 8:
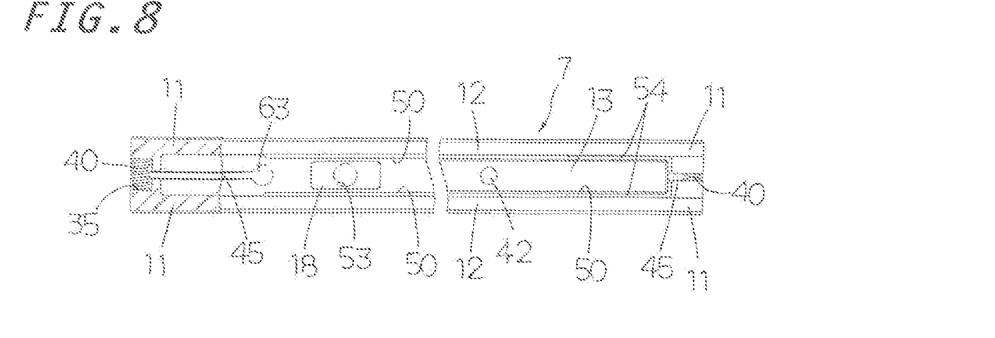
FIG. 8 is a rear view of the retainer plate, including a partially sectional view taken along line •-• of FIG. 5.
Figure 9:
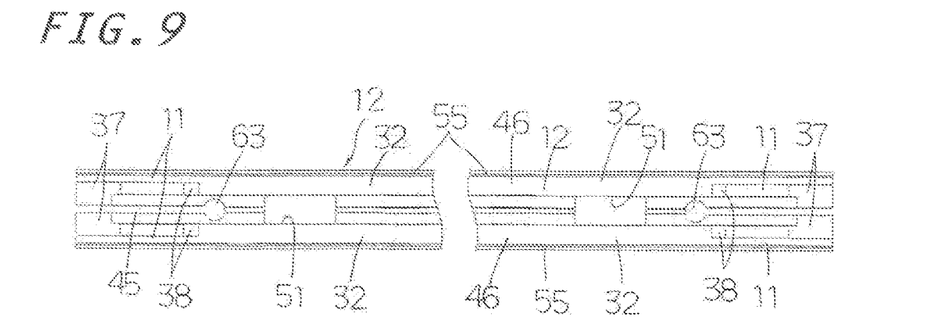
FIG. 9 is a plan view of a retainer member of the retainer plate of FIG. 6.
Figure 10:
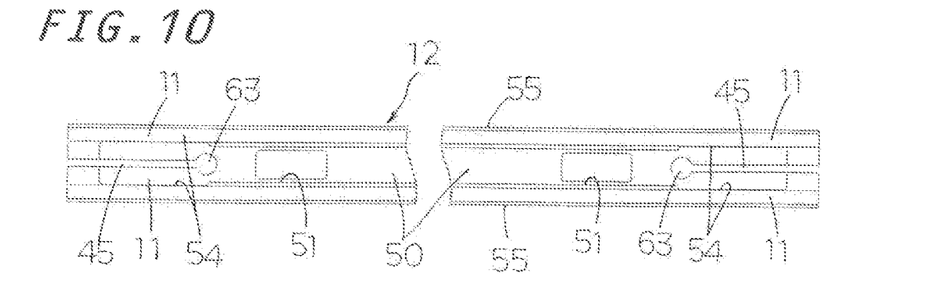
FIG. 10 is a rear view of the retainer member of the retainer plate of FIG. 6.

In the linear motion guide unit according to the present invention, the carriage 3 has the guide surfaces 31 formed along the longitudinally extending load-carrying races 14 for guiding the one end surfaces 25 of the rollers 5 and has the gently curved crownings 10 formed at the opposite end portions of each raceway surface 22 for allowing the rollers 5 to smoothly enter the load areas 43 from the no-load areas 44 of the load-carrying races 14. As shown in FIGS. 4 and 5, each retainer plate 7 has the guide surfaces 32 formed thereon for guiding the other end surfaces 25 of the rollers 5 and has protrusions 30 protruding from the respective guide surfaces 32 at opposite ends 27 of the retainer member 12 of the retainer plate 7, which opposite ends face the respective crownings 10. The linear motion guide unit is characterized particularly in the following: when the rollers 5 roll into the load-carrying race 14 from the turnaround passage 16, the protrusion 30 of the retainer plate 7 presses the rollers 5 toward the guide surface 31, whereby the rollers 5 are arrayed in such a posture that the axes of the rollers 5 become orthogonal to the guide surface 31 in the region of the crowning 10 defining the no-load area 44; i.e., on the inlet side of the crowning 10, thereby preventing the occurrence of skew of the rollers 5.

Figure 17:
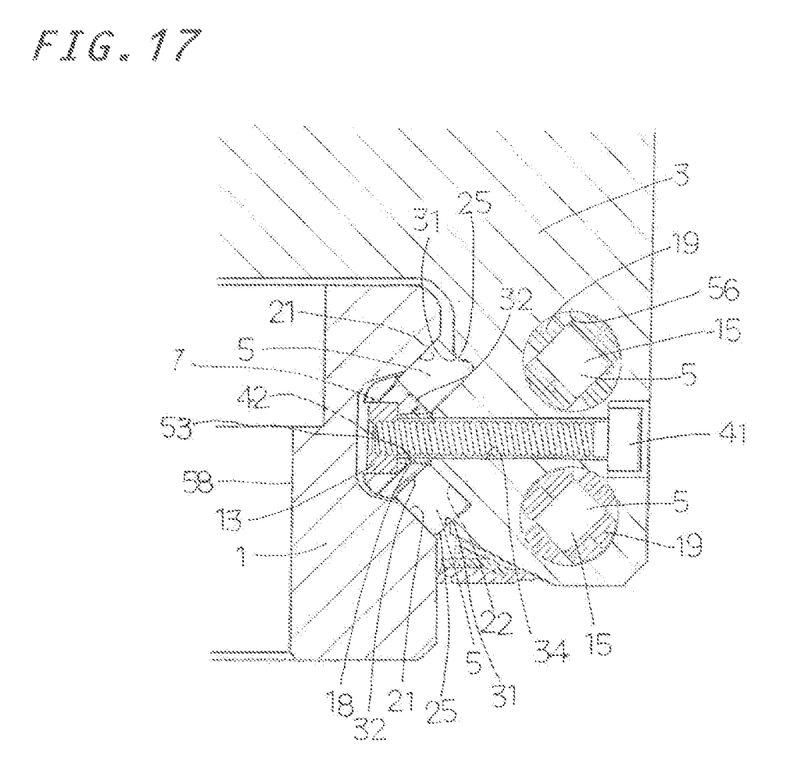
FIG. 17 is a sectional view taken along line XVII-XVII of FIG. 1, showing a state in which the retainer plate is fixed to the carriage with fastening bolts.

In the present linear motion guide unit, as shown in FIGS. 4 and 5, a convex portion 33 (having a V-shaped cross section) of the retainer plate 7 is formed in the longitudinal direction between the upper and lower guide surfaces 32 of the retainer plate 7. As shown in FIG. 2, the convex portion 33 of the retainer plate 7 is fitted into the dent-shaped locking groove 36 (having a V-shaped cross section) of the carriage 3 and formed along the longitudinal direction between the upper and lower raceway surfaces 22 of the carriage 3. As shown in FIG. 17, fastening bolts 41 are inserted through respective through holes 34 of the carriage 3 and screwed into respective threaded holes 42 formed in the fixing member 13 of the retainer plate 7, whereby the retainer plate 7 is fixed to the carriage 3. According to the present embodiment, the slider 2 is formed to such a length that can be efficiently embodied for implementing high rigidity and high precision; specifically, the carriage 3 has an overall length equivalent to approximately four times the width of the guide rail 1; i.e., the slider 2 is of an ultralong type. As shown in FIGS. 13 and 14, a length L of the crownings 10 formed in the carriage 3 is substantially 4 ? 0.5 times the diameter of the roller 5. The carriage 3 has a length determined such that the carriage 3 extends over three to four holes 58 of the guide rail 1. The length of the carriage 3 is 6.3 to 8.3 times the length of the end cap 4 as measured in the moving direction. Even in the case where the length of the crownings 10 differs depending on the overall length of the carriage 3, each protrusion 30 is formed on the retainer plate 7 in such a manner as to extend from the region of the corresponding crowning 10 defining the no-load area 44 into the region of the corresponding crowning 10 defining the load area 43.

In the present linear motion guide unit, as shown in FIGS. 4 to 11, each retainer plate 7 is composed primarily of the retainer member 12, the fixing member 13, and frame members 18. The retainer member 12 is made of a synthetic resin and has the guide surfaces 32 formed thereon for guiding the other end surfaces 25 of the rollers 5. The fixing member 13 is made of metal and is inserted into a recess 50 of the retainer member 12 formed on the back side of the guide surfaces 32. The fixing member 13 fixes the retainer member 12 to the carriage 3. The frame members 18 are disposed in respective notches 51 formed in the retainer member 12 at predetermined longitudinal positions. The frame members 18 form a predetermined gap between the fixing member 13 and the carriage 3. Also, in the present linear motion guide unit, the retainer member 12 of the retainer plate 7 has slits 45 extending in the longitudinal direction and formed in the opposite ends 27 thereof at laterally intermediate positions to thereby form a pair of elastically deformable cantilevered retainer portions 11 formed on opposite sides of each slit 45. When the upper and lower rollers 5 rolling in the load-carrying races 14 pass the cantilevered retainer portions 11, the cantilevered retainer portions 11 press the end surfaces 25 of the rollers 5 toward the guide surfaces 31 of the carriage 3 to thereby array the rollers 5 in a proper posture. The retainer member 12 has beak portions 55 for supporting edge portions of rolling surfaces of the rollers 5 so as to retain the rollers 5. The recess 50 formed in the retainer member 12 extends to the vicinities of concave portions 35 in which respective spring members 40 are disposed.

Figure 12:
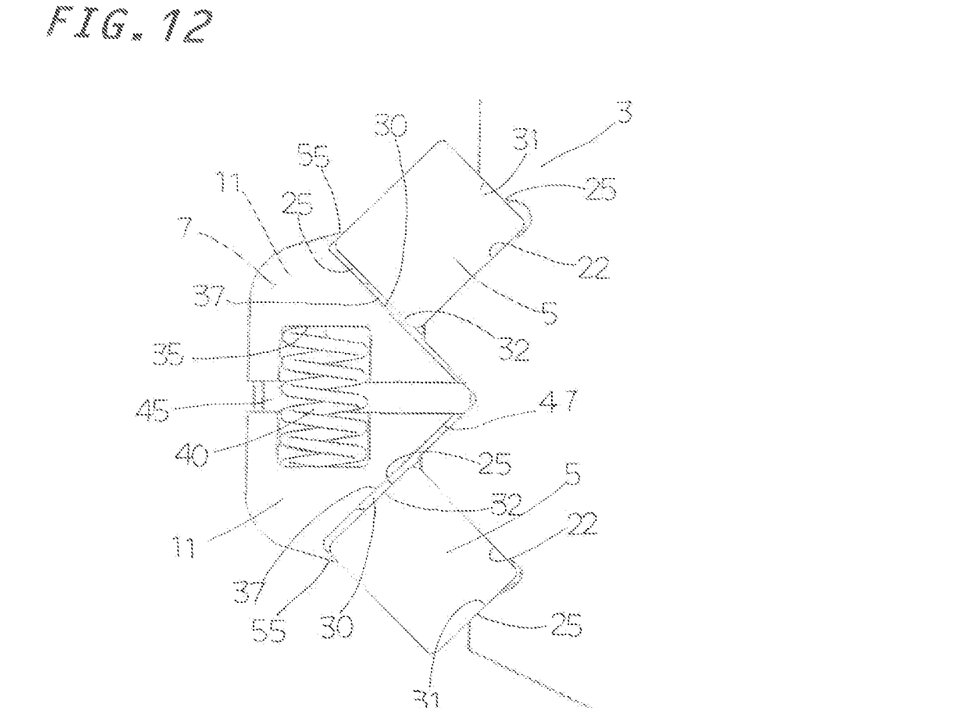
FIG. 12 is a partial front view of a carriage and the retainer plate in the linear motion guide unit as viewed from one end of the carriage toward the inlet of a load-carrying race.
Figure 15:
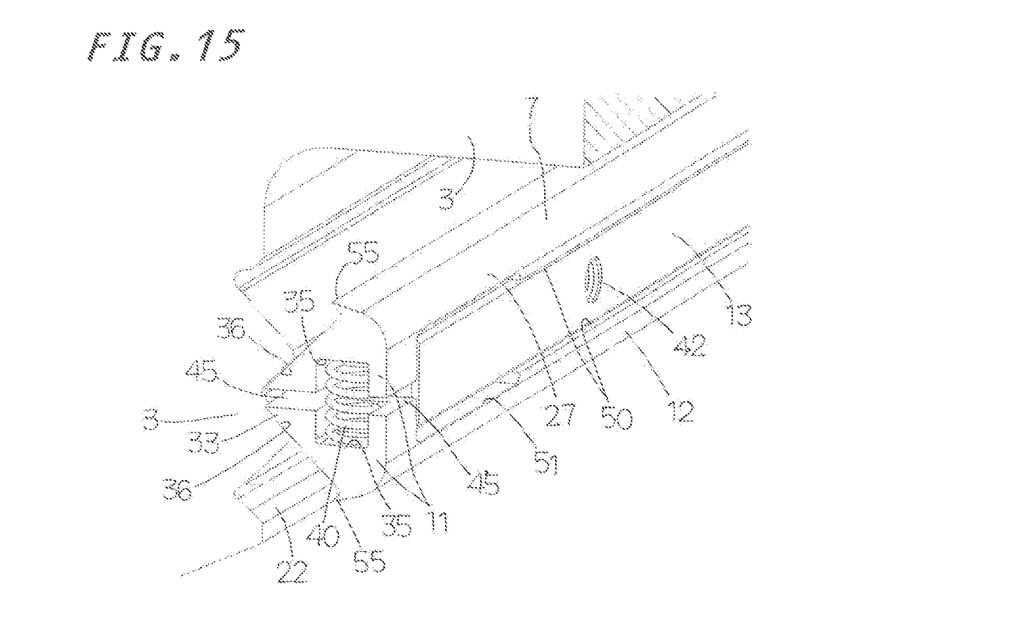
FIG. 15 is an enlarged perspective view showing the state of attachment of the retainer plate to the carriage in the linear motion guide unit.

FIG. 15 is an enlarged perspective view showing one end 27 of the retainer plate 7 attached to the carriage 3. The retainer member 12 has notches 51 formed at opposite end portions of the recess 50 accommodating the fixing member 13 so as to provide clearances for avoiding interference between the fixing member 13 and the elastically deformed cantilevered retainer portions 11. As shown in FIG. 12, the retainer member 12 receives force from the roller end surfaces 25 in such a direction as to press the guide surfaces 32. In consideration of this, the retainer member 12 is backed up by the fixing member 13. A pair of the cantilevered retainer portions 11 formed at the respective opposite ends 24 of the retainer member 12 is elastically deformed in such a direction that the gap of the slit 45 becomes narrow. The two cantilevered retainer portions 11 constituting the pair can be elastically deformed independently of each other. By means of the slit 45 being positioned at the center of a sectional shape of the retainer member 12, the protrusions 30 can be reliably pressed against the roller end surfaces 25. As shown in FIGS. 13 and 14, each protrusion 30 extends from the region of the corresponding crowning 10 defining the no-load area 44 of the load-carrying race 14 into the region of the corresponding crowning 10 defining the load area 43 of the load-carrying race 14. Therefore, the protrusion 30 arrays the rollers 5 such that the axes of the rollers 5 become orthogonal to the guide surface 31 of the carriage 3. As a result, the rollers 5 in a proper posture can be reliably introduced into the load area 43. In order to reduce an increase in sliding friction in the load area 43, the slit 45 can be extended into the load area 43 of the load-carrying race 14. In the case where the crowning 10 is formed, by means of the slit 45 extending beyond the crowning 10, sliding friction can be reduced in the load area 43.

The slit 45 extends from the end 27 of the retainer member 12 into the load area 43 of the load-carrying race 14 and is formed longer than the crowning 10. Further, in the present linear motion guide unit, the retainer plate 7 has the spring members 40 disposed between the cantilevered retainer portions 11 and pressing the cantilevered retainer portions 11 in slit-opening directions. The length of the protrusion 30 extending along the guide surface 32 is substantially two to three times the roller diameter of the roller 5. The retainer member 12 has the two guide surfaces 32, and each of the guide surfaces 32 has the protrusions 30 protruding therefrom. End portions of the guide surfaces 32 are located on the respective cantilevered retainer portions 11. Since each end 27 of the retainer member 12 is formed into the cantilevered retainer portions 11 by means of the slit 45, when the rollers 5 pass the protrusions 30, through utilization of bending of the cantilevered retainer portions 11, the protrusions 30 can come into contact with the one end surfaces 25 of the rollers 5 and can reliably press the other end surfaces 25 of the rollers 5 against the guide surfaces 31 of the carriage 3. Further, in addition to bending of the cantilevered retainer portions 11, since elastic force of the spring member 40 causes the protrusions 30 to come into contact with the roller end surfaces 25, the other end surfaces 25 of the rollers 5 can be further reliably pressed against the guide surfaces 31 of the carriage 3. By virtue of the above feature, the present linear motion guide unit can introduce the rollers 5 in a proper posture into the load areas 43 of the load-carrying races 43.

In the present linear motion guide unit, as mentioned in FIG. 14, the distance between each guide surface 31 of the carriage 3 and the corresponding guide surface 32 of the retainer member 12 facing the guide surface 31 is greater than the height (i.e., axial length) of the roller 5. As a result, gaps are formed respectively between the guide surfaces 31 and 32 and the end surfaces 25 of the rollers 5. The protrusions 30 protruding from each guide surface 32 of the retainer member 12 has such a dimension as to come into contact with the one end surfaces 25 of the rollers 5 and to press the other end surfaces 25 of the rollers 5 against the guide surface 31 of the carriage 3. As shown in FIG. 12, each protrusion 30 is formed at a position near the raceway surface 22 of the carriage 3 and faces the centers, or the positions of the axes, of the end surfaces 25 of the rollers 5. The protrusion 30 presses the centers of the roller end surfaces 25. The rollers 5 whose axes are inclined can be consistently arrayed in such a posture that the axes become orthogonal to the guide surface 31 of the carriage 3. Therefore, when the rollers 5 pass the protrusion 30, the two cantilevered retainer portions 11 bend in such a direction that the slit 45 is narrowed while pressing the rollers 5 against the guide surfaces 31 of the carriage 3.

End portions of each protrusion 30 of the retainer member 12 have inclined surfaces 37 and 38 extending between a top 47 of the protrusion 30 and the guide surface 32 such that the longitudinal section of the protrusion 30 has a trapezoidal shape. Since each protrusion 30 has the inclined surfaces 37 and 38 at the respective longitudinal end portions thereof, by means of the inclined surfaces 37 and 38, the inclined rollers 5 can be gradually arrayed in such a posture that the axes of the rollers 5 become orthogonal to the guide surface 31 of the carriage 3. As a result, the rollers 5 can smoothly roll and can be reliably arrayed such that the axes of the rollers 5 become orthogonal to the guide surface 31 of the carriage 3. Particularly, since the inclined surface 37 (first inclined surface) formed on the side toward the turnaround passage 16 is rendered small in angle of inclination and long in length, the rollers 5 can be gradually arrayed such that the axes of the rollers 5 become orthogonal to the guide surface 31 of the carriage 3. Also, since the inclined surface 38 (second inclined surface) is formed on the load-area side of the load-carrying race 14, the rollers 5 rolling from the load area can smoothly pass the protrusion 30. A surface of a portion of the protrusion 30 facing the guide surface 31 of the carriage 3 is a plane in parallel with the guide surface 31. The inclined surface 37 located on the side toward the turnaround passage 16 is smaller in angle of inclination than the inclined surface 38 located on the side toward the load carrying race 14. Further, in the present linear motion guide unit, a longitudinal length L1 of the inclined surface 37 is substantially 1.5 times or more the roller diameter, and a longitudinal length L2 of the inclined surface 38 is substantially 0.5 times or more the roller diameter. A length L3 of the protrusions 30 protruding from the guide surface 32 is substantially two times or more the roller diameter. Each protrusion 30 is formed at such a position as to press the roller end surfaces 25 at the positions of axes of rotation in cooperation with the guide surface 31 of the carriage 3. Further, the inclined surfaces 37 and 38 may have a curved longitudinal section.

In the present linear motion guide unit, the slits 45 are formed along the longitudinal direction in the respective ends 27 of the retainer member 12, thereby forming each end 27 of the retainer member 12 into a pair of the cantilevered retainer portions 11. The retainer member 12 has holes 63 extending therethrough and formed at respective proximal ends of the slits 45. As shown in FIG. 5, the hole 63 at the proximal end of each slit 45 has a cylindrical wall which is cut away on the slit 45 side. The hole 63 has a diameter greater than the width of the slit 45 so as to prevent stress concentration on the proximal end of the slit 45. By virtue of the hole 63 reducing the thicknesses of the proximal ends of the cantilevered retainer portions 11 formed in the corresponding end 27 of the retainer member 12 by means of the slit 45, the cantilevered retainer portions 11 elastically deform or bend with ease. The cantilevered retainer portions 11 are configured to rely on the elastic force of the spring member 40 incorporated in the end 27 of the retainer member 12.

Each protrusion 30 extends from the region of the corresponding crowning 10 of the carriage 3, which region is located at one end of the crowning 10 and define the no-load area 44, into the region of the corresponding crowning 10, which region defines the load area 43. Further, as shown in FIG. 12, the protrusions 30 are formed on the side toward the raceway surfaces 22 of the carriage 3, and the width of the protrusions 30 in a direction orthogonal to the longitudinal direction of the retainer plate 7 is substantially 0.5 times the roller diameter. In the present linear motion guide unit, for example, with Da representing the roller diameter, each protrusion 30 can have a length of 2 Da to 3 Da and a width of about 0.5 Da.

Figure 11A:
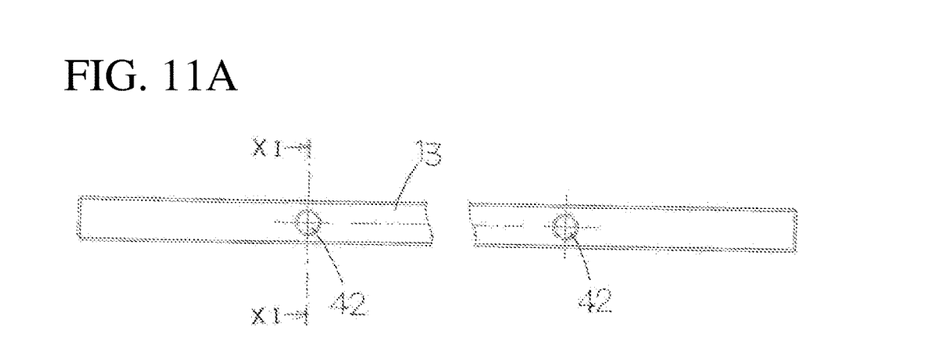
FIG. 11A is a plan view of a fixing member of the retainer plate of FIG. 6.
Figure 11B:
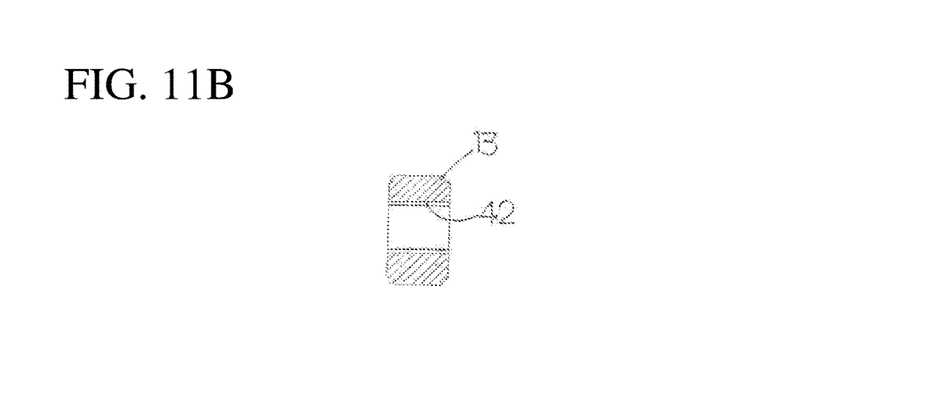
FIG. 11B is a sectional view of the fixing member taken along line XI-XI of FIG. 11A.
Figure 16:
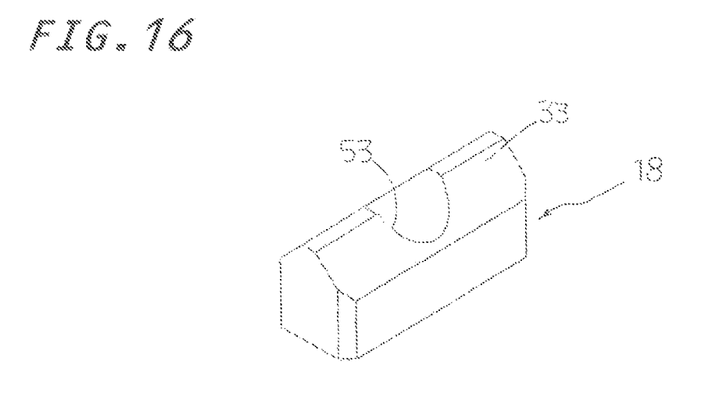
FIG. 16 is a perspective view showing a frame member of the retainer plate shown in FIG. 6.

As shown in FIG. 17, the retainer member 12 has a gable-shaped cross section orthogonal to the longitudinal direction in the form of an angle. The inclined surfaces 46 of the gable-shaped retainer member 12 serve as the planar guide surfaces 32. The top 47 of the gable-shaped retainer member 12 is fitted into the dent-shaped locking groove 36 of the carriage 3. As shown in FIG. 11A, the fixing member 13 has a plurality of the threaded holes 42 formed therein at longitudinal intervals; the retainer plate 7 and the carriage 3 have the through holes 53 and 34, respectively, formed therein at positions corresponding to the threaded holes 42; and the fastening bolts 41 are inserted through the respective through holes 34 from outside the carriage 3 and screwed into the respective threaded holes 42, whereby the retainer plate 7 is fixed to the carriage 3. At this time, since the retainer member 12 is fixed to the carriage 3 via the metal frame members 18, there can be avoided direct application of fastening force of the fastening bolts 41 to the retainer member 12, whereby deformation of the retainer member 12 can be restrained. Also, the retainer member 12 has the notches 51 formed therein so as to receive the respective frame members 18 shown in FIG. 16. Each frame member 18 has the through hole 53 and the convex portion 33 having a cross section corresponding to the gable-shaped cross section of the retainer member 12. Further, the retainer member 12 has a function (not shown) of introducing lubricant supplied from the oil supply hole 61 of the wing portion 65 of the carriage 3 into the load-carrying races 14.

The present linear motion guide unit is configured as mentioned above. As shown in FIGS. 13 and 14, since load is not imposed on the rollers 5 in the turnaround passage 16 and in the no-load area 44 of the crowning 10, the rollers 5 are apt to be inclined. If the rollers 5 roll in a skewed posture, the slider 2 moves while being accompanied by skid. When the inclined rollers 5 enter the load area 43, the rollers roll between the raceway surfaces 21 and 22 while sliding; therefore, friction increases, and sliding friction increases as a result of the end surfaces 25 pressing the guide surfaces 31 and 33, potentially resulting in generation of heat. In view of this, in order to correct the posture of the inclined rollers 5 such that the axes of the rollers 5 become orthogonal to the guide surface 31 of the carriage 3, the retainer member 12 has the protrusion 30 extending from the no-load area 44 into the load area 43 of the load-carrying race 14. As shown in FIG. 13, since the gently curved crownings 10 are formed at respective opposite end portions of the load-carrying race 14, the rollers 5 can be smoothly guided from the turnaround passage 16 to the load-carrying race 14. The depth of the crowning 10 is determined, for example, to be equivalent to the amount of elastic deformations of the rollers 5 and the raceway surfaces 21 and 22 resulting from half of the basic static rated load being imposed on the slider 2. The curve of the crowning 10 along the longitudinal direction is formed in such a manner as to have a single radius of curvature. The crownings 10 and a planar portion of the raceway surface 22 of the carriage 3 are continuously formed by simultaneous machining. R chamfered portions are formed on the respective end surfaces 26 of the carriage 3 and on respective end portions of the crownings 10. As shown in FIG. 14, the rollers 5 marked with letters a and b and having been inclined in the turnaround passage 16 can be arrayed such that the axes of the rollers 5 gradually become orthogonal to the guide surface 31 of the carriage 3 along the inclined surface 37 of the protrusion 30 as represented by the rollers 5 marked with letter c; then, the rollers 5 are guided by the protrusion 30 and have the proper posture as represented by the rollers 5 marked with letters d and e. The one end surfaces 25 of the rollers 5 marked with d and e are brought in contact with the protrusion 30, and the other end surfaces 25 of the rollers 5 marked with letters d and e are pressed against the guide surface 31 of the carriage 3; as a result, the postures of the inclined rollers 5 are corrected to a proper posture, so that the rollers 5 can be arrayed in such a proper posture that the axes of the rollers 5 become orthogonal to the guide surface 31 of the carriage 3. The rollers 5 arrayed by the protrusion 30 such that the roller axes become orthogonal to the guide surface 31 of the carriage 3 enter the load area 43 of the load-carrying race 14 as represented by the roller 5 marked with letter f. As a result of the rollers 5 entering the load area 43 of the load-carrying race 14 via the second inclined surface 38, the rollers 5 are smoothly guided and roll.

What is claimed is:

1. A linear motion guide unit comprising:
   a guide rail having first raceway surfaces extending in a longitudinal direction on respective opposite longitudinal sides of the guide rail, and
   a slider which straddles the guide rail, has second raceway surfaces facing the respective first raceway surfaces, and slides in relation to the guide rail via rollers which serve as rolling elements and roll in load-carrying races composed respectively of the first raceway surfaces and the second raceway surfaces,
   wherein the slider has a carriage which has the second raceway surfaces and return passages extending in parallel with the second raceway surfaces, end caps fixedly attached to respective longitudinally opposite end surfaces of the carriage, the rollers rolling in circulating circuits composed respectively of the load-carrying races, the return passages, and turnaround passages formed in the end caps for establishing communication between the load-carrying races and the return passages, and retainer plates disposed along the respective load-carrying races and adapted to retain the rollers to the slider;
   the carriage has first guide surfaces adapted to guide one end surfaces of the rollers and extending along the respective load-carrying races extending in the longitudinal direction, and crownings formed at opposite end portions of the second raceway surfaces for allowing the rollers to enter load areas of the load-carrying races from no-load areas of the load-carrying races;
   the retainer plates have second guide surfaces adapted to guide the other end surfaces of the rollers, and protrusions protruding from the second guide surfaces at opposite end portions thereof facing the respective crownings; and
   the rollers rolling from the turnaround passages to the load-carrying races are pressed toward the first guide surfaces by the protrusions so as to be arrayed in such a posture that axes of the rollers become orthogonal to the first guide surfaces on an inlet side of the crownings, thereby preventing the occurrence of skew of the rollers.

2. The linear motion guide unit according to claim 1, wherein
   each of the retainer plates has a convex portion having a V-shaped section and formed along the longitudinal direction between the upper and lower second guide surfaces;
   the convex portion of the retainer plate is fitted into a dent-shaped locking groove having a V-shaped section and formed in the carriage along the longitudinal direction between the upper and lower second raceway surfaces; and
   fastening bolts inserted through respective through holes of wing portions of the carriage are screwed into respective threaded holes formed in the retainer plates to thereby fix the retainer plates to the carriage.

3. The linear motion guide unit according to claim 1, wherein each of the retainer plates comprises:
   a retainer member made of a synthetic resin and having the second guide surfaces adapted to guide the other end surfaces of the rollers, a fixing member made of metal, fitted into a recess formed in the retainer member on a back side of the second guide surfaces, and adapted to fix the retainer member to the carriage, and frame members disposed in respective notches formed in the retainer member at a plurality of predetermined longitudinal positions and adapted to form a predetermined gap between the fixing member and the carriage.

4. The linear motion guide unit according to claim 3, wherein the retainer member has a gable-shaped cross section orthogonal to the longitudinal direction;

inclined surfaces of the retainer member serve as the second guide surfaces;

a top of the retainer member is fitted into the dent-shaped locking groove of the carriage;

the fixing member has a plurality of threaded holes formed at predetermined intervals in the longitudinal direction;

the retainer plate and the carriage have through holes formed at positions corresponding to the threaded holes; and the fastening bolts are inserted through the respective through holes from outside the carriage and are screwed into the respective threaded holes to thereby fix the retainer plate to the carriage.

5. The linear motion guide unit according to claim 3, wherein the retainer member has slits which are formed in opposite end portions thereof at intermediate positions between the upper and lower second guide surfaces and which extend in the longitudinal direction so that a pair of elastically deformable cantilevered retainer portions are formed on opposite sides of each of the slits; and when the upper and lower rollers rolling in the load-carrying races pass the cantilevered retainer portions, the cantilevered retainer portions press the end surfaces of the rollers toward the first guide surfaces of the carriage so as to array the rollers in the posture in which the axes of the rollers are orthogonal to the first guide surfaces.

6. The linear motion guide unit according to claim 5, wherein the retainer member has a spring member disposed between the cantilevered retainer portions and pressing the cantilevered retainer portions in slit-opening directions.

7. The linear motion guide unit according to claim 3, wherein the slits extend from the opposite end portions of the retainer plate into a load area of the load-carrying race and are longer than the crownings.

8. The linear motion guide unit according to claim 1, wherein the length of the protrusions extending along the second guide surfaces is substantially two to three times a roller diameter of the rollers.

9. The linear motion guide unit according to claim 1, wherein the end portions of each protrusion have inclined surfaces extending between a top of the protrusion and the second guide surface such that a longitudinal section of the protrusion has a trapezoidal shape;

a surface of the protrusion facing the first guide surface is a plane in parallel with the first guide surface; and a first inclined surface which is the inclined surface located on the side toward the turnaround passage is smaller in angle of inclination than a second inclined surface which is the inclined surface located on the side toward the load carrying race.

10. The linear motion guide unit according to claim 9, wherein a longitudinal length of the first inclined surface is substantially 1.5 times or more the roller diameter, and a longitudinal length of the second inclined surface is substantially 0.5 times or more the roller diameter.

11. The linear motion guide unit according to claim 9, wherein the protrusions are formed on the side toward the second raceway surface of the carriage, and a width of the protrusions in a direction orthogonal to the longitudinal direction of the retainer plate is substantially 0.5 times the roller diameter.

12. The linear motion guide unit according to claim 1, wherein each of the protrusions extends from a region of the corresponding crowning formed on the carriage, in which the region is located at one end of the crowning and defines the no-load area, into a region of the corresponding crowning which defines the load area.

* * * * *